Dec. 10, 1968     O. C. KINDORF     3,415,474
HANGER FOR INSULATED PIPE
Filed Oct. 21, 1966     2 Sheets-Sheet 1
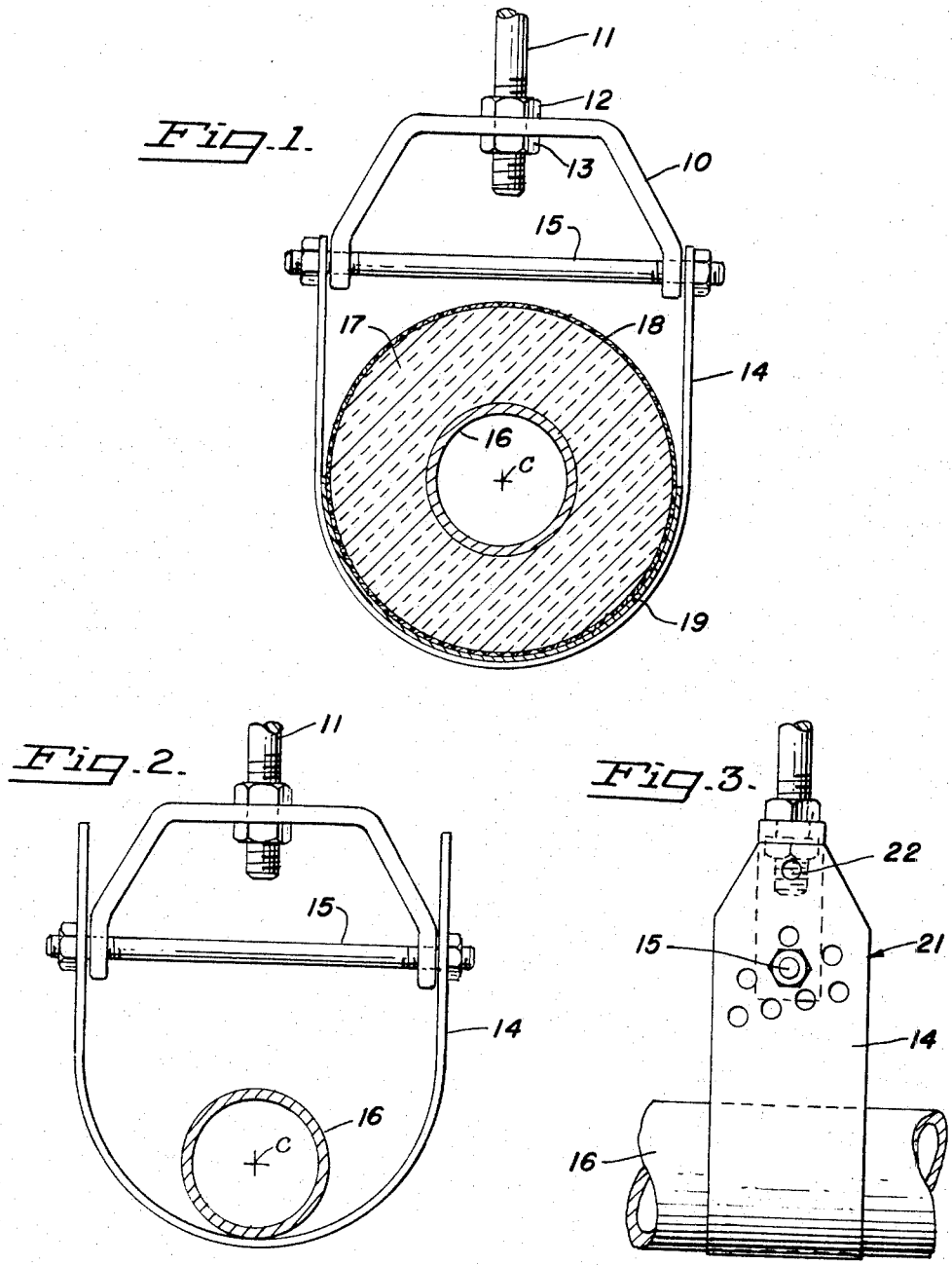
INVENTOR
ORLAN C. KINDORF
BY
ATTORNEYS Dec. 10, 1968  O. C. KINDORF  3,415,474
HANGER FOR INSULATED PIPE
Filed Oct. 21, 1966

INVENTOR
ORLAN C. KINDORF
BY
ATTORNEYS

United States Patent Office 3,415,474
Patented Dec. 10, 1968

3,415,474
HANGER FOR INSULATED PIPE
Orlan C. Kindorf, 4024 Tilden Lane,
Lafayette, Calif. 94549
Filed Oct. 21, 1966, Ser. No. 588,595
3 Claims. (Cl. 248—62)

ABSTRACT OF THE DISCLOSURE

Clevis type pipe hangers to support a pipeline at a given elevation and grade including hole patterns in the strap portions to enable the application of insulation to the pipe without altering either its elevation or its grade.

Pipe carrying fluid at other than ambient temperatures is often insulated to prevent transfer of heat either to or from the fluid. Various types of insulating materials are used generally in tubular form and any metal or good heat conductor extending between the pipe and hanger is avoided. This is particularly desirable with cold fluids which could cause reduction in temperature of the metal hanger and consequent condensation of moisture from the air and dripping of water beneath the pipe.

The pipe is installed by plumbers, pipe fitters or tradesmen skilled in the use of hangers and in the art of leveling or grading as the case may be. After being hung, the line is usually tested by being charged with fluid under pressure. Since the pipe must be observed during testing, it is customary to insulate the pipe only after testing is complete. Workers in the insulating trade are not necessarily skillful in leveling and grading of pipe lines and, since the supported line is of different diameter before and after insulation, attempts have been made to temporarily support the bare pipe in the position that it will assume in the hanger after insulation is applied. Such attempts have included unsatisfactory practices like blocking the pipe up with bits of wood or insulating material. One factor that makes such methods unsatisfactory is the standardization of hanger sizes and insulation thickness which enables hangers of one size to be used for pipe of many sizes. This is confusing when attempts are made to use temporary supports and such supports are also unstable and undependable.

An explanation of the standardization referred to above will, it is believed, facilitate an understanding of the present invention. A clevis hanger such as shown in the drawings and presently to be described includes a clevis which supports a U-shaped strap curved to embrace a pipe of standard size. With standardization of insulation thickness, the hangers for a nominal 5 inch iron pipe with actual O.D. 5.562 inches will accommodate all iron pipe sizes from ½ inch to 3 inches. A table showing sizes for the example given is as follows:

| Nominal size of supported pipe (inch) | Actual thickness of insulation | O.D. of insulation |
|---|---|---|
| ½ | 2.36 | 5.562 |
| ¾ | 2.25 | 5.562 |
| 1 | 2.12 | 5.562 |
| 1¼ | 1.95 | 5.562 |
| 1½ | 1.83 | 5.562 |
| 2 | 1.59 | 5.562 |
| 2½ | 1.34 | 5.562 |
| 3 | 1.03 | 5.562 |

Thus, it is necessary to manufacture and stock hangers of only one size instead of hangers of eight sizes but pipes of different sizes must be temporarily supported by devices having eight distinct dimensions.

SUMMARY OF THE INVENTION

A clevis is adjustably supported by an overhead threaded rod and a U-shaped hanger strap is supported from the clevis by a through bolt extending through both legs of the clevis and of the strap. The strap has additional holes marked with pipe sizes and spaced from the main holes at distances which are determined by the thickness of insulation for the different pipe sizes. This enables the pipe to be hung at the proper height and grade without insulation and then insulated without changing the height and grade by a simple adjustment of the pipe hanger.

It is, therefore, the object of the present invention to provide a pipe hanger of one nominal size to support pipes of different sizes having insulation of the same outside diameter and including means temporarily to support the pipe in its final position before the insulation is installed.

Further and more specific objects and advantages and the manner in which the invention is carried into practice are made apparent in the following specification wherein reference is made to the accompanying drawings.

In the drawings:

FIG. 1 is a view in elevation of a pipe hanger embodying the present invention and illustrating an insulated pipe in section supported therein;

FIG. 2 is a view like FIG. 1 but showing the same pipe supported in the same hanger and in the same position before the insulation has been applied;

FIG. 3 is a view in side elevation of a hanger and pipe shown in FIG. 2;

Figure 4:
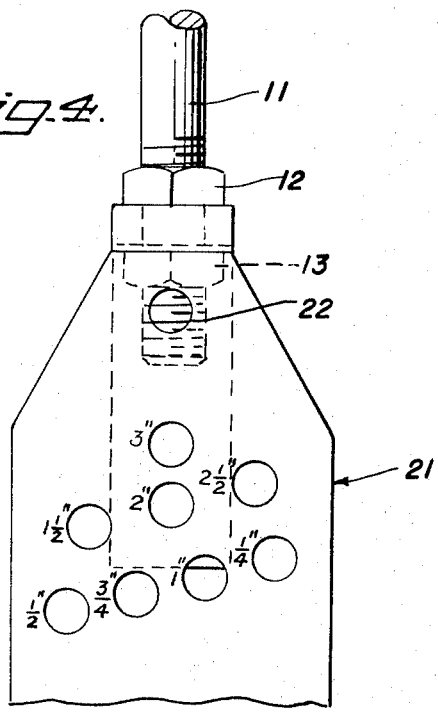
FIG. 4 is an enlarged view of the upper portion of the hanger shown in FIG. 3.

A conventional clevis-type hanger comprises, as illustrated in FIG. 1, a clevis 10 supported by a hanger rod 11 adapted to depend from overhead structure (not shown) and which is threaded at its lower end for the reception of nuts 12 and 13 which are adjusted by the installer of the hanger to insure the precisely proper elevation of the pipe. A U-shaped pipe strap 14 is supported by a through bar 15 which extends through suitable holes in the clevis and in the legs of the strap to support the insulated pipe as shown. The pipe itself is illustrated at 16 surrounded by insulating material 17 generally formed in two halves which are combined to form a cylinder during installation and bound in place by a covering material illustrated at 18. It is also conventional practice to use a semi-cylindrical cradle of metal illustrated at 19 which is of greater length than the width of the strap 14 so that the pressure of the strap is distributed over a large area of the insulating material and the strap will not form a depression in the material.

FIG. 2 shows the hanger of the present invention supporting the pipe 16 before the insulation has been applied in exactly the same position that it is supported after the application of insulation as shown in FIG. 1. In other words, this center marked "C" of the pipe in FIGS. 1 and 2 is disposed at exactly the same elevation and this is made possible by providing a plurality of holes generally indicated at 21 in FIG. 3 disposed at different elevations and adapted to receive the through rod 15 temporarily. The permanent perforations for the through rod is disposed above this group of perforations as indicated at 22 in FIG. 3. The locations of the perforations 21 are more clearly illustrated in FIG. 4 where they are shown as labeled for pipe sizes varying from ½ inch to 3 inches. The pipe of FIGS. 1 and 2 is a 2 inch pipe so with the through rod extending through the perforations labeled 2 inches, the pipe is supported as in FIG. 2 at precisely the proper distance below the through rod or at precisely the proper elevation.

In using the invention in practice, pipe fitters will assemble the line and support it with hangers in the manner shown in FIG. 2 where the through rod extends through the selected perforations depending upon the size of the pipe. Since generally accepted practice is to support pipe with hangers on a spacing of about 10 feet, one hanger can be removed during the application of the insulation. With the first length of insulation applied, the workman applying it replaces the hanger being sure to insert the through rod through the standard perforations 22 thus assuring that the pipe occupies the same elevation as when it was installed by the pipe fitters.

Figure 5:
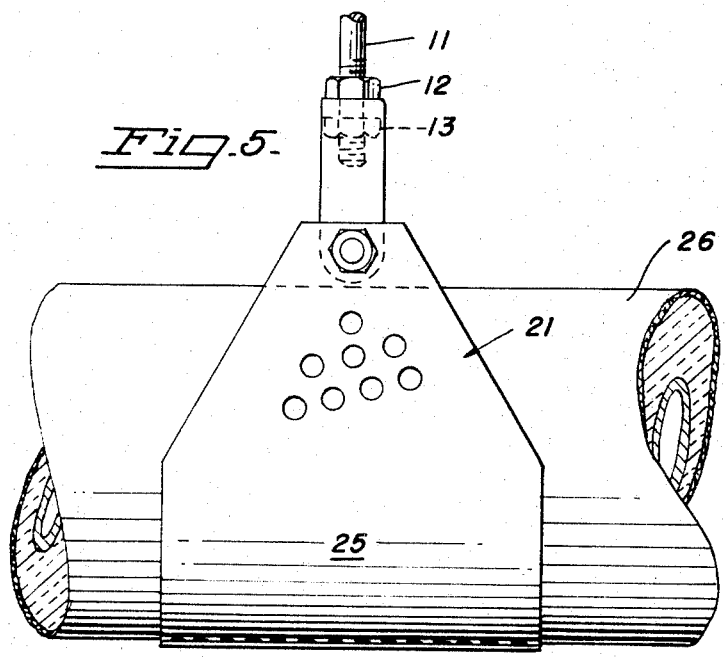
FIG. 5 is an elevation similar to FIG. 3 illustrating the application of the invention to a slightly different type of hanger.

FIG. 5 shows a modified form of the invention in which the same group of perforations 21 is applied to a sling shown at 25 and used to support an insulated pipe 26, the purpose of the sling being to eliminate the member 19 shown in FIG. 1 and still to give adequate support without high unit pressure.

In order to make the pipe hanger capable of supporting pipe of several different sizes, that is eight sizes as shown in the above list, the U-strap 14 must have for each of the perforations 22 on each of its legs a group of perforations in which one perforation is spaced downwardly from perforation 22 a distance equal to the thickness of the insulation for each of the several sizes of pipe. Thus the particular hole in the group 21 which supports the 2 inch pipe 16 as shown in FIGS. 2 and 3 is 1.59 inch below the perforations 22.

The thickness of the metal cradle 19 shown in FIG. 1 may be added to this dimension but in practice this cradle is frequently of thin sheet metal which, for practical purposes, may be disregarded.

This particular size of the hanger shown and described herein is one adapted to receive pipe of eight nominal sizes so there are eight holes in the group of holes employed to temporarily support uninsulated pipe on each leg of the U-strap. Some hangers will accommodate fewer sizes so the number of holes will be correspondingly reduced and in some cases only one such hole may be required where hangers are made to be used for pipe of only one size.

I claim:

1. In a pipe hanger which comprises a clevis and a U-strap connected by means extending through holes in the clevis and a registering pair of upper perforations, one in each leg of the U-strap, for supporting pipes of several different sizes with insulation of different thicknesses to provide a common outside diameter of insulation on the different sizes of pipe whereby hangers of a common size may be used, the improvement which comprises a pattern of perforations in each of the legs of the U-strap below the upper perforations in each leg, each perforation in the pattern being spaced below said upper perforations a distance corresponding to the thickness of insulation for one of said pipe sizes.

2. The pipe hanger of claim 1 wherein the pattern includes perforations offset from the center of said leg.

3. The pipe hanger of claim 1 wherein the perforations of the pattern are so positioned as to provide support for insulation thickness of ½″, ¾″, 1″, 1¼″, 1½″, 2″, 2½″ and 3″.

References Cited

UNITED STATES PATENTS

| | | | |
|---|---|---|---|
| 1,576,307 | 3/1926 | Casey | 248—59 |
| 1,784,244 | 12/1930 | Morris | 248—59 XR |
| 2,714,497 | 8/1955 | Denis | 248—62 |
| 3,122,346 | 2/1964 | Seiler | 248—62 |

ROY D. FRAZIER, *Primary Examiner.*

F. DOMOTOR, *Assistant Examiner.*